(12) United States Patent
Shaw

(10) Patent No.: US 7,444,540 B2
(45) Date of Patent: Oct. 28, 2008

(54) MEMORY MIRRORING APPARATUS AND METHOD

(75) Inventor: Mark Shaw, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 11/158,187

(22) Filed: Jun. 21, 2005

(65) Prior Publication Data

US 2006/0288177 A1    Dec. 21, 2006

(51) Int. Cl.
    *G06F 11/00* (2006.01)
(52) U.S. Cl. ............................................. 714/5; 714/42
(58) Field of Classification Search ........... 714/5, 714/6, 10, 42, 52
    See application file for complete search history.

(56) References Cited

U.S. PATENT DOCUMENTS

| | | | | |
|---|---|---|---|---|
| 4,541,094 A | * | 9/1985 | Stiffler et al. ............... | 714/53 |
| 5,185,748 A | * | 2/1993 | Fujimura .................... | 714/820 |
| 5,263,034 A | * | 11/1993 | Guenthner et al. ........... | 714/47 |
| 5,619,642 A | * | 4/1997 | Nielson et al. ................ | 714/6 |
| 5,905,854 A | * | 5/1999 | Nielson et al. ................ | 714/6 |
| 6,295,591 B1 | | 9/2001 | Bealkowski et al. | |
| 6,732,243 B2 | | 5/2004 | Busser et al. | |

\* cited by examiner

*Primary Examiner*—Yolanda L Wilson

(57) ABSTRACT

Various systems and methods are provided for memory mirroring. In one embodiment, a mirror memory is provided having a memory fully buffered controller, the memory fully buffered controller being configured to facilitate access to a plurality of memories in the mirror memory by a central processing unit (CPU). A primary memory link interface configured to couple to a primary memory is provided in the memory fully buffered controller. The memory fully buffered controller further comprises first error logic configured to detect whether a first data error exists in a first data output from the primary memory, and second error logic configured to detect whether a second data error exists in a second data output from the mirror memory. The memory fully buffered controller also comprises selection logic that selects one of the first data output or the second data output to be applied to the CPU.

18 Claims, 4 Drawing Sheets

MEMORY MIRRORING APPARATUS AND METHOD

BACKGROUND

Memory mirroring is typically employed to provide redundant storage for data so as to ensure that data is not lost due to catastrophic failure or errors that may occur in memory devices. Memory mirroring provides redundant storage of data by storing identical copies of data written to a primary memory in a counterpart mirror memory.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
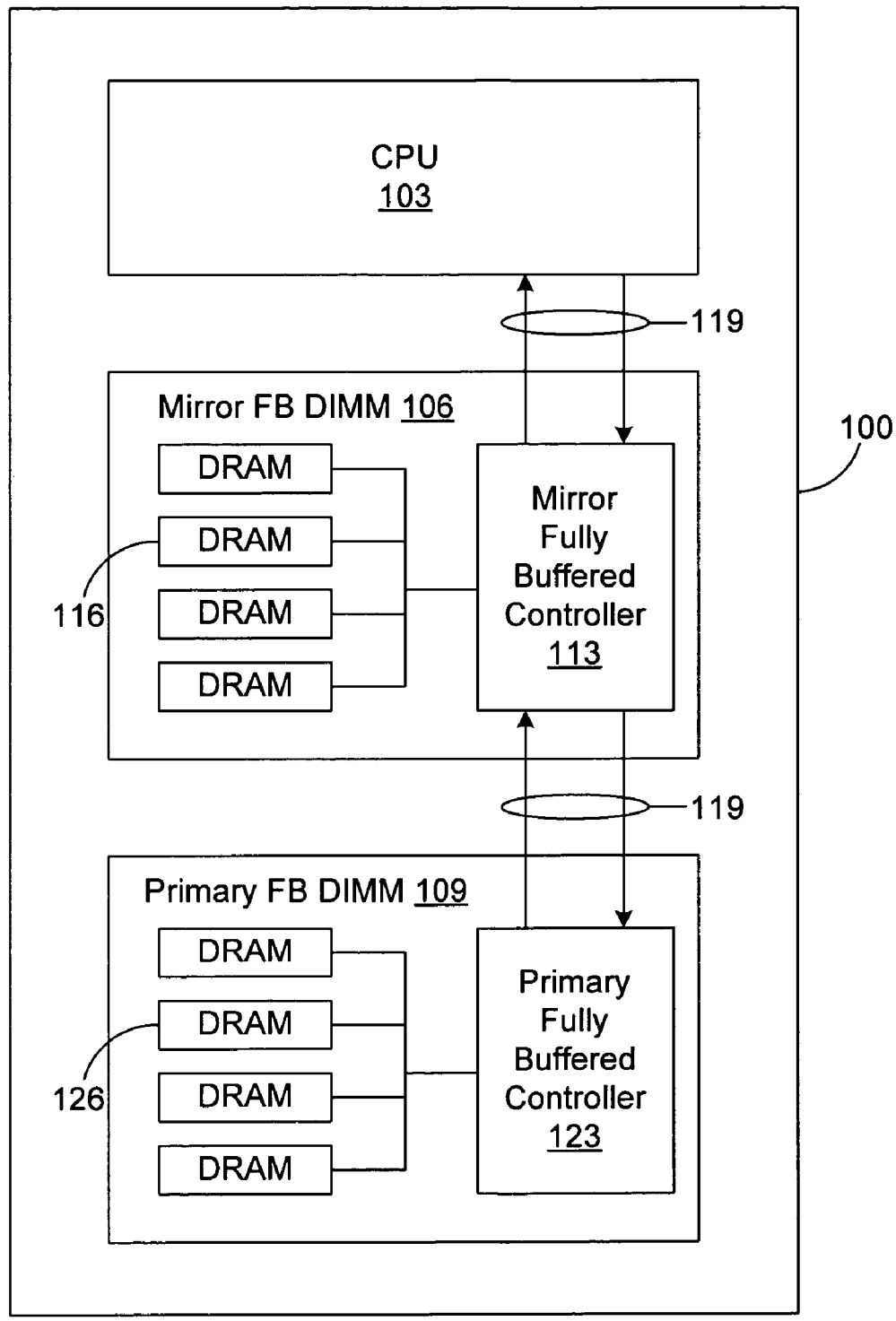
FIG. 1 is a schematic diagram of a computer system that includes a central processing unit (CPU), a mirror fully buffered controller, and a primary fully buffered memory according to an embodiment of the present invention.

Referring to FIG. 1, shown is a computer system 100 according to an embodiment of the present invention. In this respect, the computer system 100 may be, for example, a server, a personal computer system, or other system as can be appreciated. The computer system 100 includes a central processing unit (CPU) 103. The computer system 100 also includes a mirror fully buffered Dual Inline Memory Module (DIMM) 106 and a primary fully buffered DIMM 109.

Within the mirror fully buffered DIMM 106 is a mirror fully buffered controller 113. The mirror fully buffered controller 113 is coupled to a number of random access memories 116 such as, for example, Dynamic Random Access Memories (DRAMs) or other types of suitable memories. The memories 116 may be embodied in one or more memory chips as can be appreciated. The mirror fully buffered controller 113 is also coupled to the CPU 103 by virtue of a high speed bus 119.

Similar to the mirror fully buffered DIMM 106, the primary fully buffered DIMM 109 includes a primary fully buffered controller 123. The primary fully buffered controller 123 is coupled to a number of random access memories 126 such as, for example, dynamic random access memories (DRAMs) or other types of random access memories. Also, the primary fully buffered controller 123 is electrically coupled to the mirror fully buffered controller 113 by virtue of the high speed data bus 119. Data communication is established between the primary fully buffered DIMM 109 and the CPU 103 through the mirror fully buffered controller 113.

The mirror fully buffered DIMM 106 and the primary fully buffered DIMM 109 may comprise, for example, memory cards or other modules that include random access memories 116/126 that are accessed by the CPU 103. The mirror fully buffered controller 113 and the primary fully buffered controller 123 each facilitate access to each of the memories 116 and 126 by the central processing unit 103. The mirror fully buffered controller 113 includes a primary memory input that is configured to couple to the primary fully buffered controller 123 of the primary fully buffered DIMM 109 by way of the high speed data bus 119.

The mirror fully buffered DIMM 106 and the primary fully buffered DIMM 109 are "fully buffered" in that buffer circuitry and other circuitry is employed in the form of the mirror fully buffered controller 113 and the primary fully buffered controller 123 as an interface between the high speed data bus 119 and the memories 116/126. The mirror fully buffered controller 113 and the primary fully buffered controller 123 are each configured to distribute address and control information among the memories 116/126, respectively to facilitate read and write operations from the CPU 103. By virtue of the use of the mirror fully buffered controller 113 and the primary fully buffered controller 123, various address and control circuitry are eliminated on the motherboard of the computer system 100 in order to properly access the memories 116/126 in order to perform read and write operations as the case may be.

The high speed interface 119 between the mirror fully buffered DIMM 106 and the CPU 103, and between the primary fully buffered DIMM 109 and the mirror fully buffered controller 113, may operate at extreme high speeds ranging from, for example, 4.8 gigabits per second to 6.4 gigabits per second or greater. In this respect, the high speed data busses 119 may comprise a plurality of differential pins. For example, in one embodiment, ten differential pins may be employed to facilitate communication between the CPU 103 and the mirror fully buffered DIMM 106 or the primary fully buffered DIMM 109, and 14 differential pins may be employed to facilitate data communication flowing from either the mirror fully buffered DIMM 106 or the primary fully buffered DIMM 109 to the CPU 103. Other combinations of differential pins or other types of electrical data communication may be employed as is appropriate.

By virtue of the use of the mirror fully buffered controller 113 and the primary fully buffered controller 123, the pin count necessary to provide access to each of the memories 116/126 is reduced significantly as there is no need to provide the pins necessary to access the memories 116/126 directly from a motherboard. Also, timing is improved for access amongst the various memories 116/126, thereby resulting in faster data transfer as tight timing may be specified between individual data transfers involving two or more of the memories 116/126.

During operation, the CPU 103 transmits a message to an appropriate one of the mirror fully buffered controller 113 or the primary fully buffered controller 123 to perform a read or write operation with respect to a given one of the memories 116/126. The mirror fully buffered controller 113 or the primary fully buffered controller 123 then implements the read or write operation with respect to the respective memory 116/126. Assuming, for example, that a read operation is desired, then the mirror fully buffered controller 113 or the primary fully buffered controller 123 access the data from the appropriate memory 116/126 and transmit the same to the CPU 103 by way of the high speed data bus 119 as will be discussed.

When the primary fully buffered controller 123 transmits data to the CPU 103, it is done through the mirror fully buffered controller 113. By establishing data communication between the primary fully buffered DIMM 109 and the CPU 103 through the mirror fully buffered controller 113 as such, the mirror fully buffered controller 113 may advantageously perform error checking and/or correction and ensure that a correct value is obtained from the respective mirror or primary fully buffered DIMM 106 or 109.

The mirror fully buffered DIMM 106 is employed as a mirror memory with respect to the primary fully buffered DIMM 109. In this respect, the mirror fully buffered controller 113 performs all read and write operations performed by the primary fully buffered controller 123. The state of the memories 116 mirrors the state of the memories 126. When the CPU 103 wishes to access data from one or more of the memories 126 of the primary fully buffered DIMM 109, the same data is accessed from the corresponding memories 116 by the mirror fully buffered controller 113. At this time, the mirror fully buffered controller 113 is advantageously afforded an opportunity to perform error checking and comparison with respect to the data obtained from the memories 126 of the primary fully buffered DIMM 109 and the corresponding data from the memories 116 of the mirror fully buffered DIMM 106 according to various embodiments of the present invention as will be discussed. Ultimately, the mirror fully buffered controller 113 decides which data from either the primary or mirror fully buffered DIMM 106/109 to send to the CPU 103. Since data from either the primary or mirror fully buffered DIMM 106/109 is thus selected to be transmitted to the CPU 103 via the bus 119, the CPU 103 need not send separate read requests to the primary and mirror fully buffered DIMM 106/109 to obtain redundant data to determine, for example, if an error exists. When writing data to the primary fully buffered DIMM 109, the mirror fully buffered controller 113 automatically writes a copy of the data to the appropriate memories 116 of the mirror fully buffered DIMM 106. Consequently, the CPU 103 need to transmit two read or write requests each time such operations are performed in order to read/write to both the primary and mirror fully buffered DIMMs 106/109. This effectively provides for mirroring of data while advantageously reducing traffic on the data bus 119 by half. In addition, error checking or correction is advantageously performed by the mirror fully buffered controller 113 rather than by circuitry on a motherboard or by the CPU 103 itself.

Figure 2:
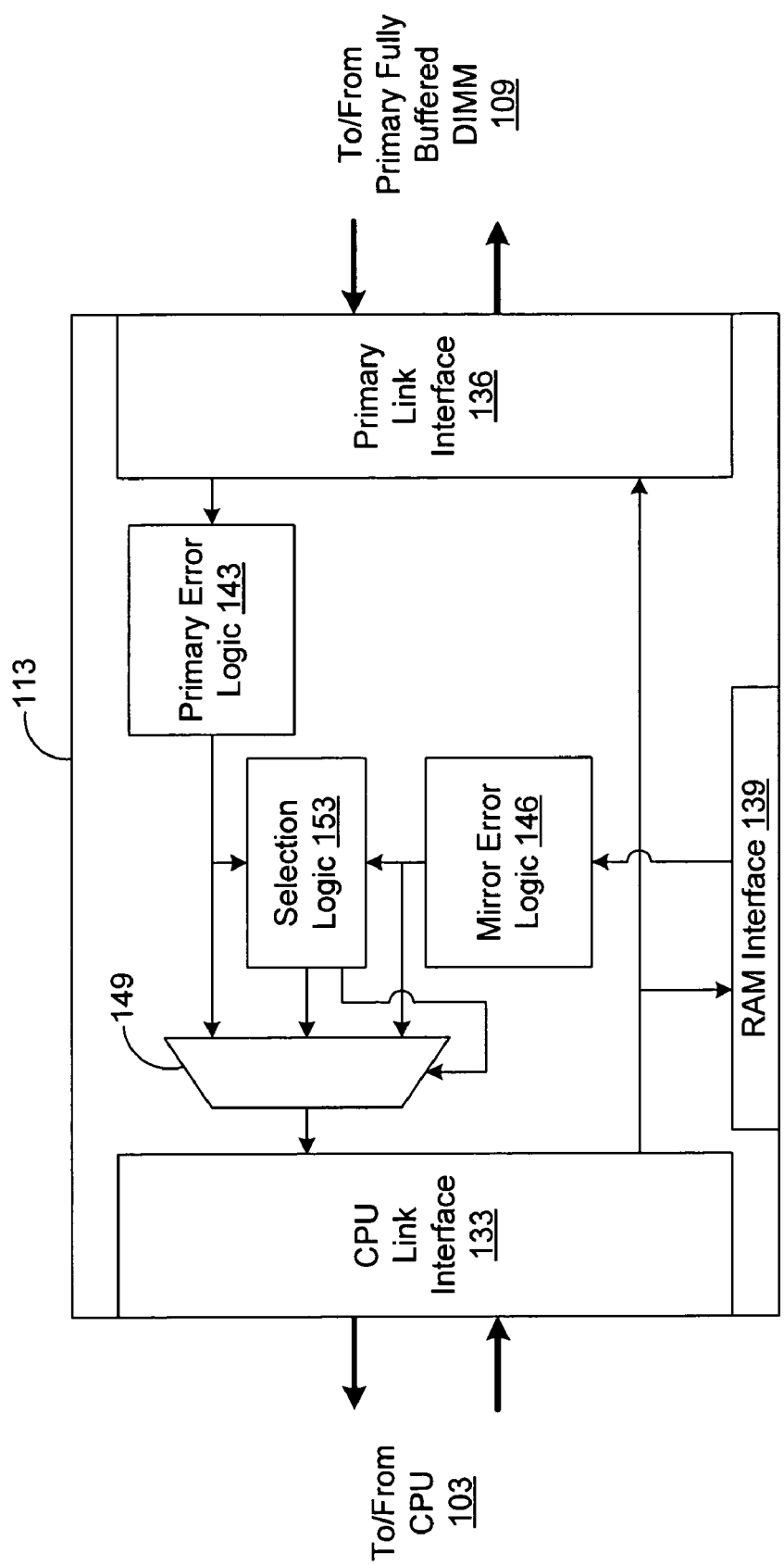
FIG. 2 is a schematic diagram of a computer system of the mirror fully buffered memory according to an embodiment of the present invention.

Referring next to FIG. 2, shown is schematic block diagram of the mirror fully buffered controller 113 according to an embodiment of the present invention. The mirror fully buffered controller 113 includes a CPU link interface 133 and a primary link interface 136. The mirror fully buffered controller 113 also includes a RAM interface 139.

The CPU link interface 133 is configured to couple to the CPU 103 by way of the high speed data bus 119 as described above. Also, the primary link interface 136 is configured to couple to the primary fully buffered DIMM 109 by way of the high speed interface 119 as described. The RAM interface 139 is configured to establish data communication with each of the memories 116. In one embodiment, the memories 116 comprise, for example, Dynamic Random Access Memory (DRAM) or other appropriate types of memories as can be appreciated by those with ordinary skill in the art. The mirror fully buffered controller 113 also includes primary error logic 143 and mirror error logic 146.

An output of the primary link interface 136 is received as an input to the primary error logic 143. The output of the primary error logic 143 is applied to a multiplexer 149 and selection logic 153. An output of the RAM interface 139 is applied to the mirror error logic 146. The output of the mirror error logic 146 is then applied to the selection logic 153 as well as to an input of the multiplexer 149. The selection logic 153 generates a control input that is applied to the multiplexer 149. The output of the multiplexer 149 is applied to the CPU link interface 133.

During operation, the CPU 103 may transmit a read request or a write request directed to the memories 126 of the primary fully buffered DIMM 109 (FIG. 1). The mirror fully buffered DIMM 106 is employed as a mirror memory of the primary fully buffered DIMM 109. In this respect, the data that is written to or read from the primary fully buffered DIMM 109 is also written to and read from the mirror fully buffered DIMM 106 concurrently. The RAM interface 139 of the mirror fully buffered controller 113 is configured to recognize when a particular read or write request from the CPU 103 is destined for the primary fully buffered DIMM 109. In this respect, the RAM interface 139 causes the same read or write operation to occur with respect to the memories 116 of the mirror fully buffered DIMM 106 that will occur with respect to the memories 126 of the primary fully buffered DIMM 109 as orchestrated by the primary fully buffered controller 123.

Assuming that a read operation is to be performed, the RAM interface 139 then obtains the desired data from the specified location of one of the memories 116 and applies the same to the mirror error logic 146. Similarly, the primary fully buffered controller 123 (FIG. 1) also reads the same data from the respective one of the memories 126. The primary fully buffered controller 123 then transmits the data read from the respective one of the memories 126 to the mirror fully buffered controller 113, such data being received by the primary link interface 136. Thereafter, the data is applied to the primary error logic 143.

Both the primary error logic 143 and the mirror error logic 146 may each comprise circuitry that performs, for example, a cyclical redundancy check (CRC). Alternatively, the primary error logic 143 and the mirror error logic 146 may each comprise error correcting code (ECC). In the case where the primary and mirror error logic 143 and 146 comprise code to perform a cyclical redundancy check, the primary error logic 143 and the mirror error logic 146 operate to determine whether an error is detected in the data received from the primary link interface 136 or the RAM interface 139, respectively. In the case that the primary error logic 143 and the mirror error logic 146 each employ error-correcting code (ECC), they may attempt to correct any errors detected in the data received from the primary link interface 136 or the RAM interface 139, respectively. In the event that the primary error logic 143 and the mirror error logic 146 make a correction to the data, the primary error logic 143 and the mirror error logic 146 inform the selection logic 153 that such a correction had been made.

The selection logic 153 receives the data from the primary error logic 143 and the mirror error logic 146. The selection logic 153 also receives data indicating whether a data error exists in the respective data received from the primary error logic 143 or the mirror error logic 146. Alternatively, where error correction code (ECC) is employed by the primary error logic 143 and the mirror error logic 146, an indication may also be provided as to whether a correction had been performed upon the data received from the primary link interface 136 or the RAM interface 139, as the case may be.

Thereafter, the selection logic 153 makes a decision as to whether to apply the data from the primary error logic 143 or the mirror error logic 146 to the CPU link interface 133 to be transmitted to the CPU 103 (FIG. 1). In making this determination, the selection logic 153 will consider the various inputs from the primary error logic 143 and the mirror error logic 146 including the data and any indication of the existence of an error in such data or that such data was corrected as the case may be. The selection logic 153 controls which data is to be applied to the CPU link interface 133 by generating a control input to the multiplexer 149. The discussion that follows describes a number of examples of selection scenarios that may occur based upon such information.

In one embodiment, the primary error logic 143 and the mirror error logic 146 may perform a cyclical redundancy check on the data received from the primary link interface 136 and the RAM interface 139. In the case that the data from one of the primary fully buffered DIMM 109 or the mirror fully buffered DIMM 106 has experienced an error, then the selection logic 153 would select a non-erroneous one of the data outputs from the primary error logic 143 and the mirror error logic 146 that is to be applied to the CPU through the CPU interface 133. If the data output of both the primary error logic 143 and the mirror error logic 146 indicate that a data error exists, then the selection logic 153 may select a predefined one of the primary of mirror error logic outputs such as the data from the primary fully buffered DIMM 109. In addition, the selection logic 153 may transmit an indication to the CPU 103 that an error exists in the data.

In an additional embodiment, the primary error logic 143 and the mirror error logic 146 employs error correcting code (ECC). In such case, where an error is detected in the data from the primary link interface 136 or the RAM interface 139 by the primary error logic 143 or the mirror error logic 146, respectively, the primary error logic 143 or the mirror error logic 146 would attempt to correct the error itself. In such case, the selection logic 153 is further configured to select an uncorrected one of the data outputs from the primary error logic 143 or the mirror error logic 146. In such a scenario, it is assumed that the data from only one of the primary link interface 136 of the RAM interface 139 includes an error that is corrected. The uncorrected one of the data outputs is selected as any correction made might be faulty, for example, if a multiple bit error has occurred that can not be corrected using error correction code (ECC).

In a subsequent example, if both the data from the primary error logic 143 and the mirror error logic 146 is indicated as having been corrected, and the data output from both of the primary error logic 143 and the mirror error logic 146 are equal, then the selection logic may be configured to select a predefined one of the data output to be applied to the CPU link interface 133. In one embodiment, the output of the primary error logic 143 may be selected. The fact that the corrected data from both the primary error logic 143 and the mirror error logic 146 are equal provides an indication that the correction of both errors resulted in correct data from both sources. Consequently, the data from the primary error logic 143 is selected as it emanates from the primary fully buffered DIMM 109, although the actual choice of source in such a scenario is of no great consequence.

In another scenario, however, the data supplied by the RAM interface 139 to the mirror error logic 146 and the data supplied by the primary link interface 136 to the primary error logic 143 may each include an error that the primary error logic 143 and the mirror error logic 146 attempted to correct, respectively. However, it may be the case that the corrected data from the primary error logic 143 and the mirror error logic 146 that is applied to the selection logic 153 do not equal each other. In such case, then it is apparent that at least one of the data outputs from the primary error logic 143 or the mirror error logic 146 is incorrect and that the corresponding attempted correction failed. It may also be the case that both the outputs of the primary error logic 143 and the mirror error logic 146 are incorrect and that the correction failed in both cases.

In either situation, the selection logic 153 cannot determine whether either one of the data values received from either the primary error logic 143 or the mirror error logic 146 are correct. Accordingly, the selection logic 153 may then select a predefined one of the outputs of the primary error logic 143 or the mirror error logic 146 to apply to the CPU link interface 133 for transmission to the CPU 103. In addition, the selection logic 153 may transmit an indication that an error was detected that may not have been corrected in the data itself to the CPU 103.

In still another example, the data supplied by the RAM interface 139 to the mirror error logic 146 and/or the data supplied by the primary link interface 136 to the primary error logic 143 may be incorrect due to the fact that a so called data mismatch has occurred. A data mismatch may occur, for example, due to silent data corruption. For example, an address bit or command bit may be flipped at some point when data is read from the memories 116/126, thereby resulting in a read of the wrong data from the respective memory 116/126. Assuming that the wrong data read from the wrong memory location is applied to either the mirror error logic 146 or the primary error logic 143, it may be the case that no error is detected, whether CRC or ECC is employed in the mirror error logic 146 and the primary error logic 143. This is because the operation of the mirror error logic 146 and/or the primary error logic 143 upon data information and the redundant information included within the data read from the wrong memory location results in a correct result with respect to such data. The problem is not that the data itself is corrupted, but that it was accessed from the wrong location in a memory.

In such a case, the data from the mirror error logic 146 and the primary error logic 143 that is supplied to the selection logic 153 would not be equal even though no indication is received from the mirror error logic 146 and the primary error logic 143 that an error exists or was corrected, etc. In this circumstance, the selection logic 153 is faced with a situation in which an error exists in the outputs from at least one of the mirror error logic 146 and the primary error logic 143, but it cannot determine which output is incorrect. Consequently, the selection logic 153 may then select a predefined one of the outputs of the primary error logic 143 or the mirror error logic 146 to apply to the CPU link interface 133 for transmission to the CPU 103. In addition, the selection logic 153 may transmit an indication that an error was detected that may not have been corrected in the data itself to the CPU 103.

In order to inform the CPU 103 that an error was detected in any of the above scenarios, the selection logic 153 may manipulate the multiplexer 149 so as to apply an output from the selection logic 153 to the CPU link interface 133. This output may be, for example, a predefined data sequence that indicates to the CPU 103 that a data error has occurred and that the attempt to read data from the memories has failed.

In addition, the selection logic 153 may be configured to turn the data mirroring function off. In this respect, the selection logic 153 manipulates the multiplexer 149 so as to continuously apply the output from the primary error logic 143 directly to the CPU link interface 133. In this respect, the data from the primary fully buffered DIMM 109 (FIG. 1) is passed through the mirror fully buffered DIMM 106 (FIG.1) and the memory mirroring is not employed.

Figure 3:
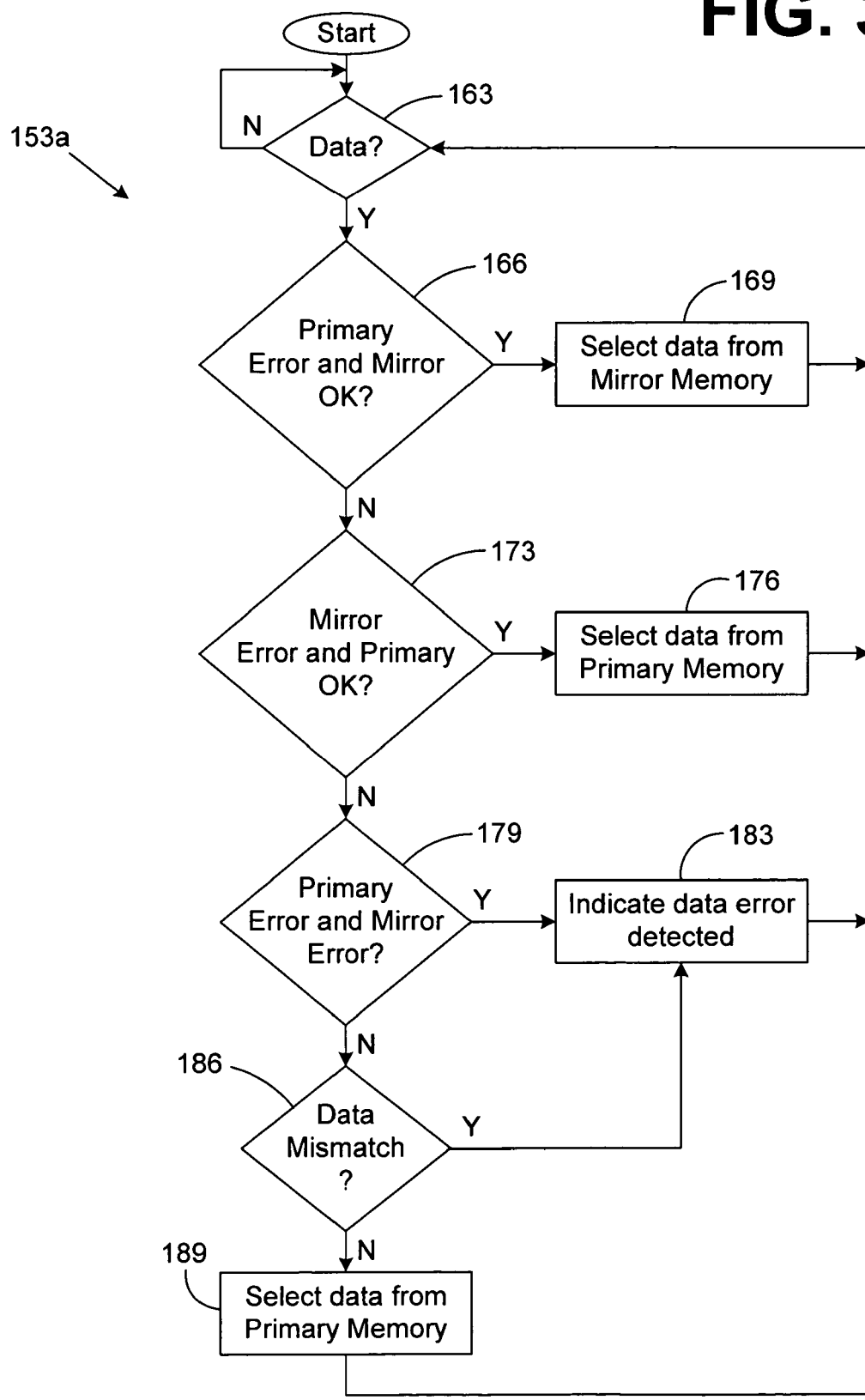
FIG. 3 is a flow chart of one example of selection logic employed in the mirror fully buffered memory of FIG. 2 according to an embodiment of the present invention.

Referring next to FIG. 3, shown is a flow chart of one embodiment of the selection logic 153, denoted herein as selection logic 153*a*, according to an embodiment of the present invention. Alternatively, the flow chart of FIG. 3 may be viewed as depicting steps of a method implemented in the mirror fully buffered controller 113. The selection logic 153*a* is employed, for example, when the primary error logic 143 and the mirror error logic 146 each employ a cyclical redundancy check (CRC). Beginning with box 163, the selection logic 153a determines whether data has been received from the primary error logic 143 and the mirror error logic 146 that is to be passed to the central processing unit 103 (FIG. 1). If so, then the selection logic 153a proceeds to box 166 in which it is determined whether there is an error in the data from the primary error logic 143 (FIG. 2) and whether the data from the mirror error logic 146 is correct. This may be determined by examining indications from the primary error logic 143 and the mirror error logic 146 as to whether the data has been determined to be correct or that an error has been detected in such data.

Assuming that the data from the primary error logic 143 has experienced an error and that the data from the mirror error logic 146 is correct, then the selection logic 153a proceeds to box 169 in which the data from the mirror error logic 146 is selected and applied to the CPU link interface 133. Thereafter, the selection logic 153a reverts back to box 163.

On the other hand, if the data from the primary error logic 143 is correct in box 166, then the selection logic 153a proceeds to box 173. In box 173, the selection logic 153a determines whether the data from the mirror error logic 146 is incorrect and the data from the primary error logic 143 is correct. If such is the case, then the selection logic 153a proceeds to box 176. Otherwise, the selection logic 153a progresses to box 179. In box 176, the data from the primary error logic 143 is selected to be applied to the CPU link interface 133 and thereafter transmitted to the CPU 103. Thereafter, the selection logic 153a reverts back to box 163. Thus, in boxes 166 through 173, it is seen that the selection logic 153a selects a non-erroneous one of the first and second data outputs from the primary and mirror error logic 146 and 149 to be applied to the CPU if one of the data outputs has experienced an error.

In box 179, the selection logic 153a determines whether an error exists in both the outputs from the primary error logic 143 and the mirror error logic 146. If so, then the selection logic 153a proceeds to box 183. Otherwise, the selection logic 153a progresses to box 186. In box 183, the selection logic 153a transmits an indication of a data error to the CPU 103 through the CPU link interface 133. In one embodiment, this may be done by controlling the multiplexer 149 to select the output of the selection logic 153a through which the data error indication is transmitted to be passed on to the CPU 103. In this respect, the selection logic 153a may transmit a predefined sequence of data to the CPU 103 instead of the data output from either the primary error logic 143 or the mirror error logic 146. This predefined sequence of data informs the CPU 103 that a data error has occurred and that the desired data cannot be read from the respective memory.

Alternatively, the selection logic 153a may select data from the primary error logic 143 to be applied to the CPU link interface 133 to be transmitted to the CPU 103 along with an indication that a data error has occurred. In order to do so, the multiplexer 149 may be manipulated accordingly. In this respect, the selection logic 153a may select a predefined one of the outputs from the primary error logic 143 or the mirror error logic 146 since both are erroneous. Thereafter, the selection logic 153a reverts back to box 163.

Assuming that the selection logic 153 arrives at box 186, then the selection logic 153a determines whether a data mismatch has occurred. As described above, this situation exists, for example, if neither the primary error logic 143 nor the mirror error logic 146 indicate that an error has been detected, but the data output from the primary error logic 143 is not equal to the data output from the mirror error logic 146. If such is the case, then the selection logic 153a proceeds to box 183 as shown. Otherwise, the selection logic 153a proceeds to box 189.

In box 189, the data from the primary error logic 143 is selected by manipulation of the multiplexer 149 to be transmitted to the CPU link interface 133 and thereafter to the CPU 103. In such case, the data from both the primary error logic 143 and the mirror error logic 146 are both correct, and a default one of the two is selected. In one embodiment, the default is the data from the primary error logic 143. Thereafter, the selection logic 153a reverts back to box 163.

Figure 4:
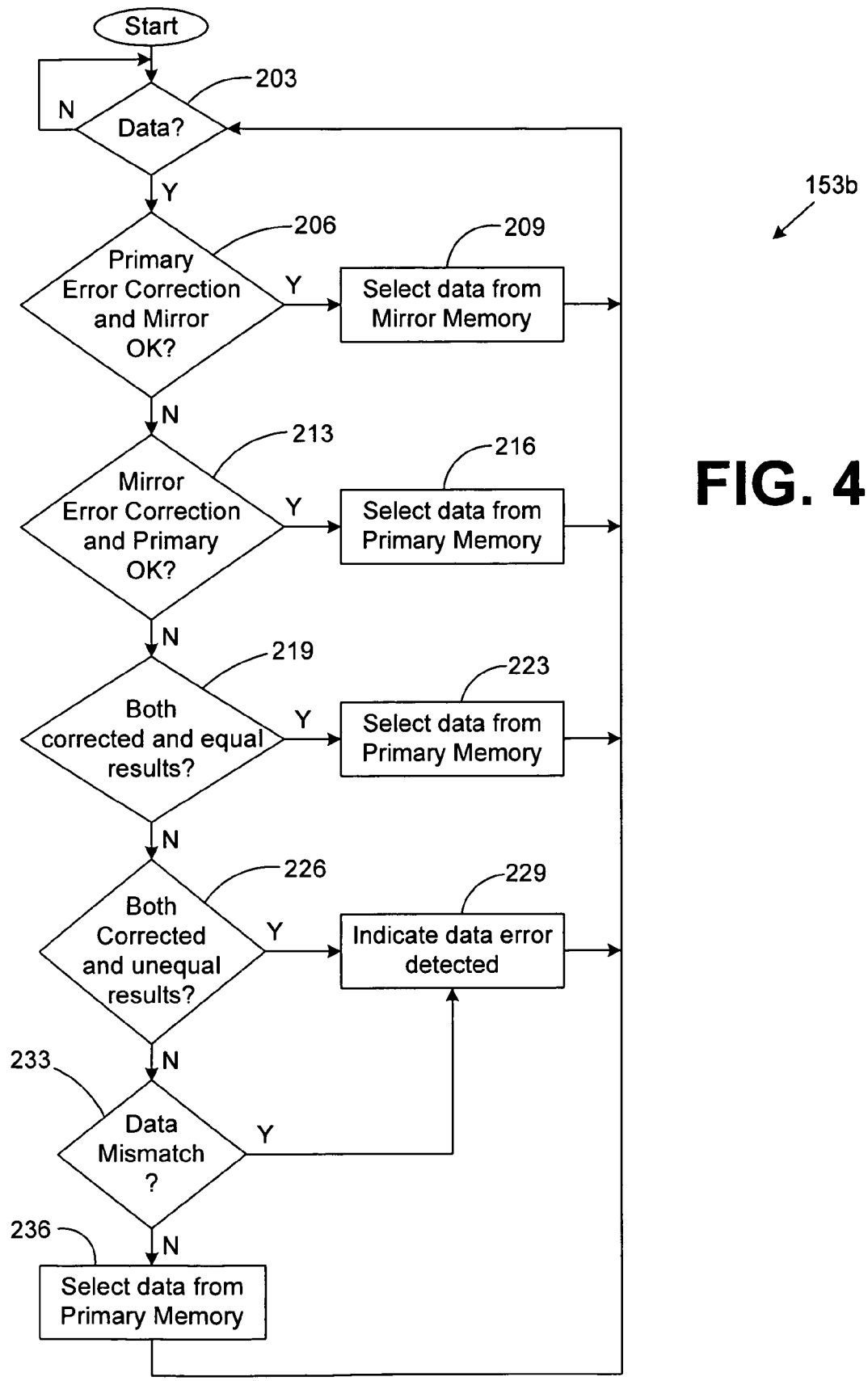
FIG. 4 is a flow chart of another example of selection logic employed in the mirror fully buffered memory of FIG. 2 according to an embodiment of the present invention.

Referring next to FIG. 4, shown is a flow chart of another embodiment of the selection logic 153 denoted herein as selection logic 153b according to an embodiment of the present invention. The selection logic 153b reflects the configuration of the selection logic 153 in the case that the selection logic implements error correcting code (ECC) as described above. Alternatively, the flow chart of FIG. 4 may be viewed as depicting steps of a method implemented in the mirror fully buffered controller 113.

Beginning with box 203, the selection logic 153b determines whether data has been received from both the primary error logic 143 and the mirror error logic 146. If so, then the selection logic 153b proceeds to box 206. In box 206, the selection logic 153b determines whether an error in the data from the primary error logic has been detected and corrected, and if the data from the mirror error logic 146 has not been corrected. In this respect, the primary error logic 143 would provide the data to the selection logic 153 along with an indication that the data was corrected by virtue of an implementation of the error correcting code (ECC).

If such is the case, then the selection logic 153b proceeds to box 209. Otherwise, the selection logic 153b progresses to box 215. In box 209, the data from the mirror error logic 146 emanating from the mirror fully buffered DIMM 106 is selected for application to the CPU link interface 133 for transmission to the CPU 103. In this respect, the selection logic 153 applies a control input to the multiplexer 149 to select the output of the mirror error logic 146 to apply such to the CPU link interface 133 as shown. Thereafter, the selection logic 153b reverts back to box 203.

In box 213, the selection logic 153b determines whether the data from the mirror error logic 146 has been detected and corrected, and if the data from the primary error logic 143 has not experienced an error requiring correction. In such case, the data from the primary error logic 143 should be correct as per the check performed by the error correcting code. If such is the case, then the selection logic 153b proceeds to box 216. Otherwise, the selection logic 153b progresses to box 219. In box 216, the data from the primary error logic 143 obtained from the primary fully buffered DIMM 109 is selected for application to the CPU link interface 133 for transmission to the CPU 103 by manipulating the multiplexer 149 appropriately. Then, the selection logic 153b reverts back to box 203.

In box 219, the selection logic 153b determines whether the data from both the primary error logic 143 emanating from the primary fully buffered DIMM 109 and the data from the mirror error logic 146 emanating from the mirror fully buffered DIMM 106 have both been both been corrected, and that the data from the primary error logic 143 and the mirror error logic 146 are equal. This indicates that the data from both locations has been corrected and, chances are, both are correct given that the results from both corrections are identical. If such is the case, then the selection logic 153b proceeds to box 223. Otherwise, the selection logic 153b progresses to box 226.

In box 223, the selection logic 153b selects the data from the predefined one of the primary error logic 143 or the mirror error logic 146. As a default, for example, the data from the primary error logic 143 ultimately emanating from the primary fully buffered DIMM 109 is selected as all indications are that such data is correct and the primary memory is the primary location for data storage. Thereafter, the selection logic 153b reverts back to box 203 as shown.

In box 226, for the selection logic 153b determines whether both the data from the primary error logic 143 emanating from the primary fully buffered DIMM 109 and the data from the mirror error logic 146 emanating from the mirror fully buffered DIMM 106 have been corrected, but the data from the primary error logic 143 and the mirror error logic 146 are unequal. In such case, one or both of the data outputs from the primary error logic 143 and the mirror error logic 146 may be incorrect. In such case, the selection logic a 153b proceeds to box 229. Otherwise, the selection logic 153b progresses to box 233.

In box 229, the selection logic 153b transmits an indication to the CPU 103 through the CPU link interface 133 that a data error has been detected and that the data transmitted may be incorrect. In this respect, the selection logic 153b may transmit a predefined sequence of data to the CPU 103 instead of the data output from either the primary error logic 143 or the mirror error logic 146. This predefined sequence of data informs the CPU 103 that a data error has occurred and that the desired data cannot be read from the respective memory.

Alternatively, the selection logic 153b may select data from the primary error logic 143 to be applied to the CPU link interface 133 to be transmitted to the CPU 103 along with an indication that a data error has occurred. In order to do so, the multiplexer 149 may be manipulated accordingly. In this respect, the selection logic 153b may select a predefined one of the outputs from the primary error logic 143 or the mirror error logic 146. Thereafter, the selection logic 153b reverts back to box 203 as shown.

Assuming that the selection logic 153b progresses to box 233, then the selection logic 153b determines whether a data mismatch has occurred. As described above, this situation exists, for example, if neither the primary error logic 143 nor the mirror error logic 146 indicate that an error has been detected, but the data output from the primary error logic 143 is not equal to the data output from the mirror error logic 146. If such is the case, then the selection logic 153b proceeds to box 229 as shown. Otherwise, the selection logic 153a proceeds to box 236.

In box 236, the data from the primary error logic 143 that emanates from the primary fully buffered DIMM 109 is selected to be applied to the CPU interface 133 by manipulation of the multiplexer 149. This is because no errors were detected by either the primary error logic 143 or the mirror error logic 146 and no correction occurred in either one of these locations. Thus, in one embodiment, the data emanating from the primary fully buffered DIMM 109 is selected as predefined default as can be appreciated. Thereafter, the selection logic 153b reverts back to box 203 to wait for the next data to arrive.

In one embodiment, the selection logic 153 is implemented in terms of hardware. In such case, the selection logic 153 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein. Alternatively, the selection logic 153 may be implemented in terms of software, or a combination of hardware and software.

The flow charts of FIGS. 3 and 4 show the functionality and/or operation of an implementation of the selection logic 153. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow charts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the selection logic 153 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the selection logic 153 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In addition, according to another embodiment, a method for memory mirroring using a mirror memory having a fully buffered controller is provided. This method comprises the steps of employing the fully buffered controller to facilitate access to a plurality of memories in the mirror memory by a central processing unit (CPU), and coupling a primary memory link interface in the fully buffered controller to a primary memory. This method further comprises the steps of detecting, in the fully buffered controller, whether a first data error exists in a first data output from the primary memory received through the primary memory link interface, and detecting, in the fully buffered controller, whether a second data error exists in a second data output from the mirror memory. The method also comprises the step of selecting, in the fully buffered controller, one of the first data output or the second data output to be applied to the CPU.

In additional embodiments, the method further comprises the steps of establishing data communication between the primary memory and the CPU through the fully buffered controller. The first and second data errors may be detected by performing a cyclical redundancy check (CRC) or using an error-correcting code (ECC). Also, the step of selecting, in the fully buffered controller, one of the first data output or the second data output to be applied to the CPU may further comprise the step of selecting a non-erroneous one of the first and second data outputs to be applied to the CPU if one of the first and second data outputs has experienced an error.

The method may further comprise the steps of attempting to correct the first data error if the first data error exists, and attempting to correct the second data error if the second data error exists. Also, the step of selecting, in the fully buffered controller, one of the first data output or the second data output to be applied to the CPU may further comprise the step of selecting an uncorrected one of the first and second data outputs to be applied to the CPU if one of the first and second data outputs has been corrected by one of the first and second error logic, respectively.

In still another embodiment, the method may further comprise the steps of attempting to correct the first data error if the first data error exists, and attempting to correct the second data error if the second data error exists. Also, the step of selecting, in the fully buffered controller, one of the first data output or the second data output to be applied to the CPU may further comprise the step of selecting a predefined one of the first and second data outputs to be applied to the CPU if both the first and second data outputs have been corrected and the first data output equals the second data output.

In yet another embodiment, the method may further comprise the steps of attempting to correct the first data error if the first data error exists, and attempting to correct the second data error if the second data error exists. The method also includes the step of informing the CPU of the existence of a data error if both the first and second data outputs have been corrected and the first data output does not equal the second data output. Also, the step of selecting, in the fully buffered controller, one of the first data output or the second data output to be applied to the CPU may further comprise the step of selecting a predefined one of the first and second data outputs to be applied to the CPU if both the first and second data outputs have been corrected and the first data output does not equal the second data output.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A system for memory mirroring, comprising: a mirror memory having a memory fully buffered controller, the memory fully buffered controller being configured to facilitate access to a plurality of memories in the mirror memory by a central processing unit (CPU); a primary memory link interface in the memory fully buffered controller configured to couple to a primary memory; where the memory fully buffered controller further comprises: first error logic configured to detect whether a first data error exists in a first data output from the primary memory, the first error logic comprising logic that attempts to correct the first data error if detected; second error logic configured to detect whether a second data error exists in a second data output from the mirror memory, the second error logic further comprises logic that attempts to correct the second data error if detected; and selection logic that selects one of the first data output or the second data output to be applied to the CPU, where the selection logic further comprises logic that selects an uncorrected one of the first and second data outputs to be applied to the CPU if one of the first and second data outputs has been corrected by one of the first and second error logic, respectively.

2. The system of claim 1, wherein data communication is established between the primary memory and the CPU through the memory fully buffered controller.

3. The system of claim 1, wherein the first and second error logic are each configured to perform a cyclical redundancy check (CRC).

4. The system of claim 1, wherein the first and second error logic each further comprise error-correcting code (ECC).

5. The system of claim 1, wherein the selection logic further comprises logic that selects a non-erroneous one of the first and second data outputs to be applied to the CPU if one of the first and second data outputs has experienced an error.

6. The system of claim 1, wherein
the selection logic further comprises logic that selects a predefined one of the first and second data outputs to be applied to the CPU if both the first and second data outputs have been corrected and the first data output equals the second data output.

7. The system of claim 1, wherein
the selection logic further comprises logic that informs the CPU of the existence of a data error if both the first and second data outputs have been corrected and the first data output does not equal the second data output.

8. The system of claim 1, wherein
the selection logic further comprises logic that informs the CPU of the existence of a data error if no error is detected in either one of the first and second data outputs and the first data output does not equal the second data output.

9. A method for memory mirroring using a mirror memory having a memory fully buffered controller, comprising: employing the memory fully buffered controller to facilitate access to a plurality of memories in the mirror memory by a central processing unit (CPU); coupling a primary memory link interface in the memory fully buffered controller to a primary memory; detecting, in the memory fully buffered controller, whether a first data error exists in a first data output from the primary memory received through the primary memory link interface; attempting to correct the first data error if the first data error exists; detecting, in the memory fully buffered controller, whether a second data error exists in a second data output from the mirror memory; attempting to correct the second data error if the second data error exists; selecting, in the memory fully buffered controller, one of the first data output or the second data output to be applied to the CPU; and wherein the step of selecting, in the memory fully buffered controller, one of the first data output or the second data output to be applied to the CPU further comprises the step of selecting an uncorrected one of the first and second data outputs to be applied to the CPU if one of the first and second data outputs has been corrected by one of the first and second error logic, respectively.

10. The method of claim 9, further comprising the step of establishing data communication between the primary memory and the CPU through the memory fully buffered controller.

11. The method of claim 9, wherein the first and second data errors are detected by performing a cyclical redundancy check (CRC).

12. The method of claim 9, wherein the first and second data errors are detected using an error-correcting code (ECC).

13. The method of claim 9, wherein the step of selecting, in the memory fully buffered controller, one of the first data output or the second data output to be applied to the CPU further comprises the step of selecting a non-erroneous one of the first and second data outputs to be applied to the CPU if one of the first and second data outputs has experienced an error.

14. The method of claim 9,
wherein the step of selecting, in the memory fully buffered controller, one of the first data output or the second data output to be applied to the CPU further comprises the step of selecting a predefined one of the first and second data outputs to be applied to the CPU if both the first and second data outputs have been corrected and the first data output equals the second data output.

15. The method of claim 9, further comprising the step of: informing the CPU of the existence of a data error if both the first and second data outputs have been corrected and the first data output does not equal the second data output.

16. The method of claim 9, further comprising the step of:
informing the CPU of the existence of a data error if no error is detected in either one of the first and second data outputs and the first data output does not equal the second data output.

17. A system for memory mirroring, comprising: first means for facilitating access to a plurality of memories in a mirror memory by a central processing unit (CPU); second means for establishing data communications between a primary memory and the CPU through the first means; selection means for selecting one of a first data output from the primary memory or a second data output from the mirror memory for application to the CPU based upon an existence of a data error in at least one of the first and second data outputs; and means for attempting to correct the data error in the at least one of the first and second data outputs if detected; and the selection means further comprises means for selecting an uncorrected one of the first and second data outputs to be applied to the CPU if one of the first and second data outputs has been corrected.

18. The system of claim 17, wherein a non-erroneous one of the first and second data outputs is selected to be applied to the CPU if the data error exists in one of the first and second data outputs.

* * * * *